2 Sheets—Sheet 1.
K. KNOTT.
REFRIGERATING APPARATUS.
No. 175,468. Patented March 28, 1876.
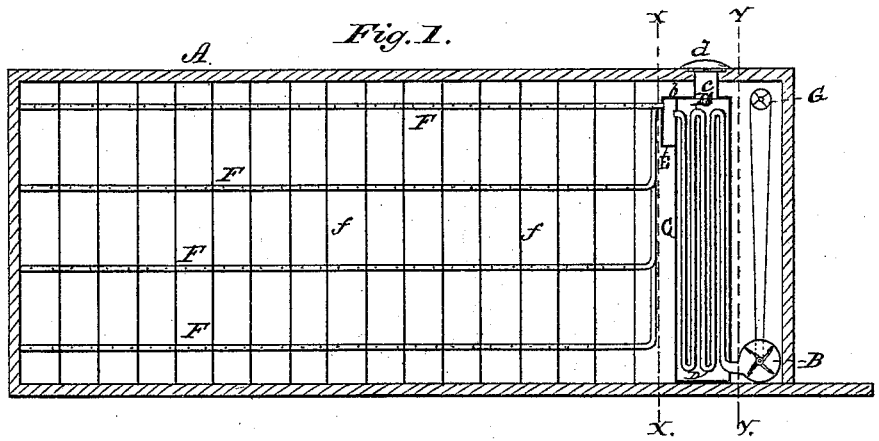
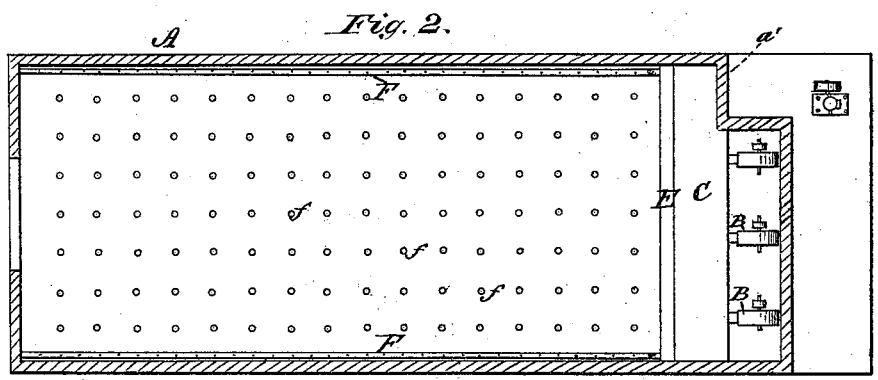
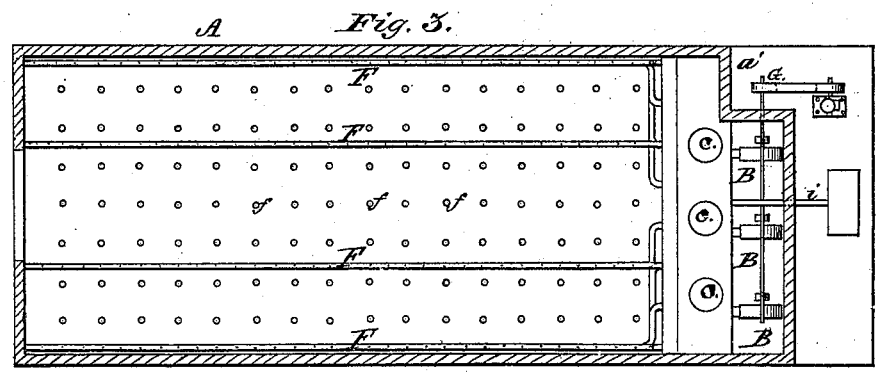
WITNESSES: INVENTOR:
Solon C. Kemon Kennard Knott
Amos W. Hart BY
ATTORNEYS.

2 Sheets—Sheet 2.

K. KNOTT.
REFRIGERATING APPARATUS.

No. 175,468. Patented March 28, 1876.

WITNESSES:
Solon C. Kemon
Amos W. Hart

INVENTOR:
Kennard Knott
BY
ATTORNEYS.

UNITED STATES PATENT OFFICE.

KENNARD KNOTT, OF CHICAGO, ILLINOIS.

IMPROVEMENT IN REFRIGERATING APPARATUS.

Specification forming part of Letters Patent No. 175,468, dated March 28, 1876; application filed March 10, 1876.

*To all whom it may concern:*

Be it known that I, KENNARD KNOTT, of Chicago, in the county of Cook and State of Illinois, have invented a new and Improved Method and Apparatus for Preserving Meat for Transportation and Storage; and I do hereby declare that the following is a full, clear, and exact description of the same.

The object of my invention is to effect an improvement in means for preserving fresh meat, fish, &c., either for storing, or for shipping by land or sea, in temperate and torrid climates.

The invention is an improvement in that class of refrigerating apparatus in which a fan-blower or equivalent device is arranged in a closed chamber, and the body of air within the chamber is circulated through a freezing coil or box, and distributed by means of perforated pipes, so as to reduce and equalize the temperature throughout the chamber.

The apparatus I employ consists of a perfectly air-tight packing room or chamber, having hollow walls provided with air-spaces and non-conducting filling, and one or more fan-blowers placed within the packing-room; also a freezing-box containing one or more coils of air-pipe, and provided with an air-chest, from which the air driven through the coil or coils is distributed to a series of perforated pipes extending along the top and sides of the packing-room, so that cold air is constantly discharged directly downward, and also from the sides the whole length of the packing-room, the warmer air of the same naturally rising and being drawn through the open spaces at the top of the tank to the blower or blowers in the rear of the tank, through and by which it is again passed into the packing-room. I also employ flanged uprights or columns, and horizontal bars or bearers, attached thereto by means of bolts, for the purpose of supporting slatted shelves, upon which the meat is placed in tiers or layers.

My invention is applicable to railway-cars and ships, and also for storing. In the one case I propose the packing room or case shall be itself the body of the car, and in the case of ships their sides may be constructed like those of the packing room or case hereinafter described, or such room or case may be separately constructed in the hold or elsewhere.

Figure 5:
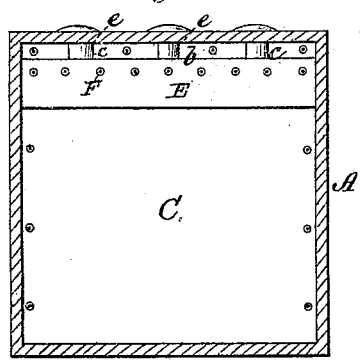
Figure 6:
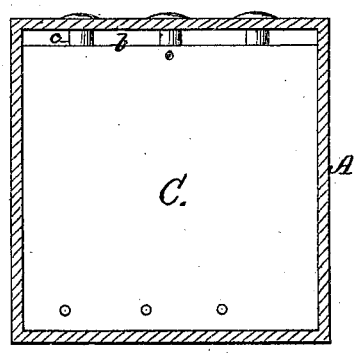
Figure 7:
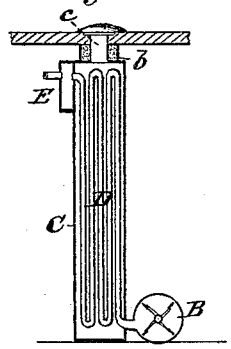
Figure 8:
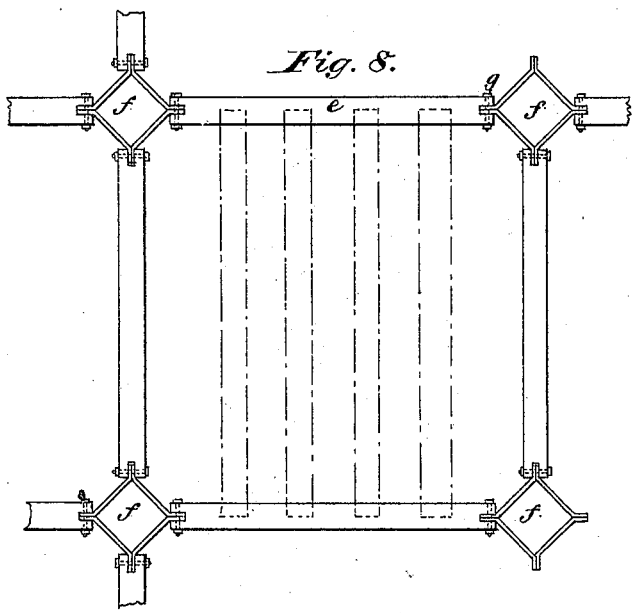
Figure 10:
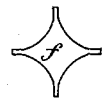
Figure 9:
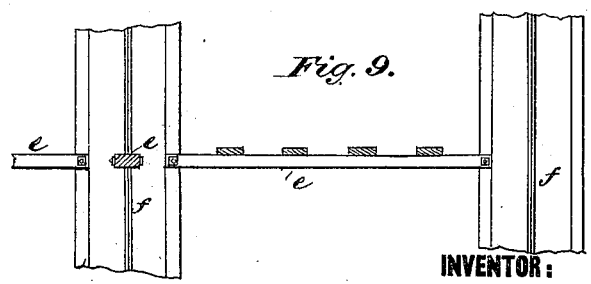

In the accompanying drawing, forming part of this specification, Figure 1 is a sectional elevation of my improved packing-room and apparatus. Figs. 2 and 3 are horizontal sections at bottom and top, respectively. Fig. 4 is a detail enlarged section, showing the construction of the wall of the packing-room. Figs. 5 and 6 are, respectively, cross-sections on lines $x\,x$ and $y\,y$, Fig. 1. Fig. 7 is a detail section of the freezing-box and a fan-blower. Fig. 8 shows in plan the construction and arrangement of uprights, bearers, and slats laid therein to support the meat or other article to be preserved. Fig. 9 is a section of Fig. 8. Fig. 10 represents in plan two different forms of flanged uprights.

I will first proceed to describe the construction of the packing-room. The inner and outer walls $a$ are of wood, and the middle wall $c$ of iron. The space between the walls $a$ and $c$ is filled with a non-conducting substance, as charcoal, sawdust, &c., while a dead-air space is formed between the walls $c$ and $b$.

The meat or other substance packed in the chamber is supported upon a series of slatted shelves resting upon bearers or cross-bars $e$, attached to uprights or columns $f$. The uprights $f$ are constructed of sheet or plate iron, and perforations are formed in the flanges thereof, to receive the screws by which bearers are attached. The bearers have open slots in their ends to adapt them to receive or embrace the flanges of the uprights, and screws or screw-bolts $g$ are inserted, as shown in Figs. 8 and 9, to hold them securely, and also to brace the uprights and tie them all together throughout the packing-room, thus enabling them to better withstand the severe strain incident to the motion of a car or ship, and the great weight supported upon the slatted shelves.

The meat or other perishable article is so packed on the aforesaid shelves as to prevent its being moved or displaced by the motion of the car or ship, and the air has free access to and circulation around every individual piece or parcel. The meat is introduced into the packing-chamber by means of a door; but it is essential the same shall be constructed upon the non-conducting principle, and shall form an air-tight joint with the wall of the packing-room.

The main devices of my improved apparatus contained within the packing-chamber A are the fan-blowers B, freezing-box C, pipe coil or coils D, air-chest E, and distributing-pipes F. The fan-blowers B are located at the end of the packing-room, near the bottom thereof, and inclosed by drums or casings, with which the coils D connect, as shown.

The fan-blowers are operated by belts from a shaft, G, arranged at the top, and projecting laterally through the side of the packing-chamber, the corner of which is cut away at $a'$, Figs. 2 and 3, to accommodate the pulley on the shaft. Said shaft G is suitably geared with the donkey or propelling engine of the ship. (In the case of a railway car, the connection may be with one of the axles.)

The freezing-box C is constructed of plate-iron, and located directly in front of the fan-blowers B, transversely of the packing-room A. It is made of less height than the latter, in order to leave a space, $b$, above it, through which the air may return to the blowers, as will be hereinafter described. One or more tubes, $c$, extend from the top of the box C through the top of the packing-room, and are provided with removable screw-caps $d$. These tubes serve for the introduction of ice and salt, in case these are employed. The air-chest E, formed on or attached to the front and upper portion of the freezing-box C, is provided with a series of short tubes, to which the pipes or tubes F are connected by screw-joints or other suitable couplings. Said pipes F extend along the top and sides of the packing-room, and are provided with a series of perforations through their length, to allow the discharge of air into the packing-room.

The operation of the apparatus is as follows: The packing-room having been filled with meat, and a suitable degree of cold having been attained in the freezing-box C, the fan-blowers are set in motion, and a blast is propelled through the coils D, thence into the chest E, and into the pipes F, by which it is distributed through the packing-room. This air, which is thus brought in contact with and caused to circulate around the meat, is forced to return to the blowers through the space $b$, since the packing-room is made air-tight, and the air-supply of the blowers can come from no other source.

When this apparatus is employed upon a ship, or in a store-house, I do not, in most cases, contemplate the use of ice in the freezing-box C, but shall make use of the apparatus patented to Voss and Littman, May 2, 1871, or some other capable of like operation.

When said apparatus is employed, it will be connected with the box C by a pipe, $i$, Fig. 2. Upon railway-cars it will be in general more convenient to employ ice and salt in the box C, and to resupply the same from time to time, as required. In any case the same body of air is used over and over again, and continuously circulated from the beginning to the end of the trip of the car or ship, or, if it be a stationary structure, as a store-house, during the time the preservation is desired. But in case of the use of the patented freezing apparatus above referred to, when the due degree of cold has been once produced in the chamber, it will not be necessary to keep up the operation of the said apparatus, and it will only be applied from time to time, as conditions require.

What I claim is—

1. The circulating apparatus composed of the fan-blowers, the freezing-box having a space above it, the pipe coil or coils contained within it, and the perforated air-distributing pipes, in combination with a packing-chamber, as shown and described, whereby a circulation of the same body of cold air is maintained in the chamber without contact with the refrigerating agent, as set forth.

2. The freezing-box provided with a distributing air-chest and a coil or coils, extending through the refrigerating agent, and connecting with the air-chest, as shown and described.

3. The combination of the slotted bearers, and screws for securing the same, with the flanged columns, having a series of perforations, as shown and described.

KENNARD KNOTT.

Witnesses:
AMOS W. HART,
SOLON C. KEMON.